United States Patent Office 3,388,428
Patented June 18, 1968

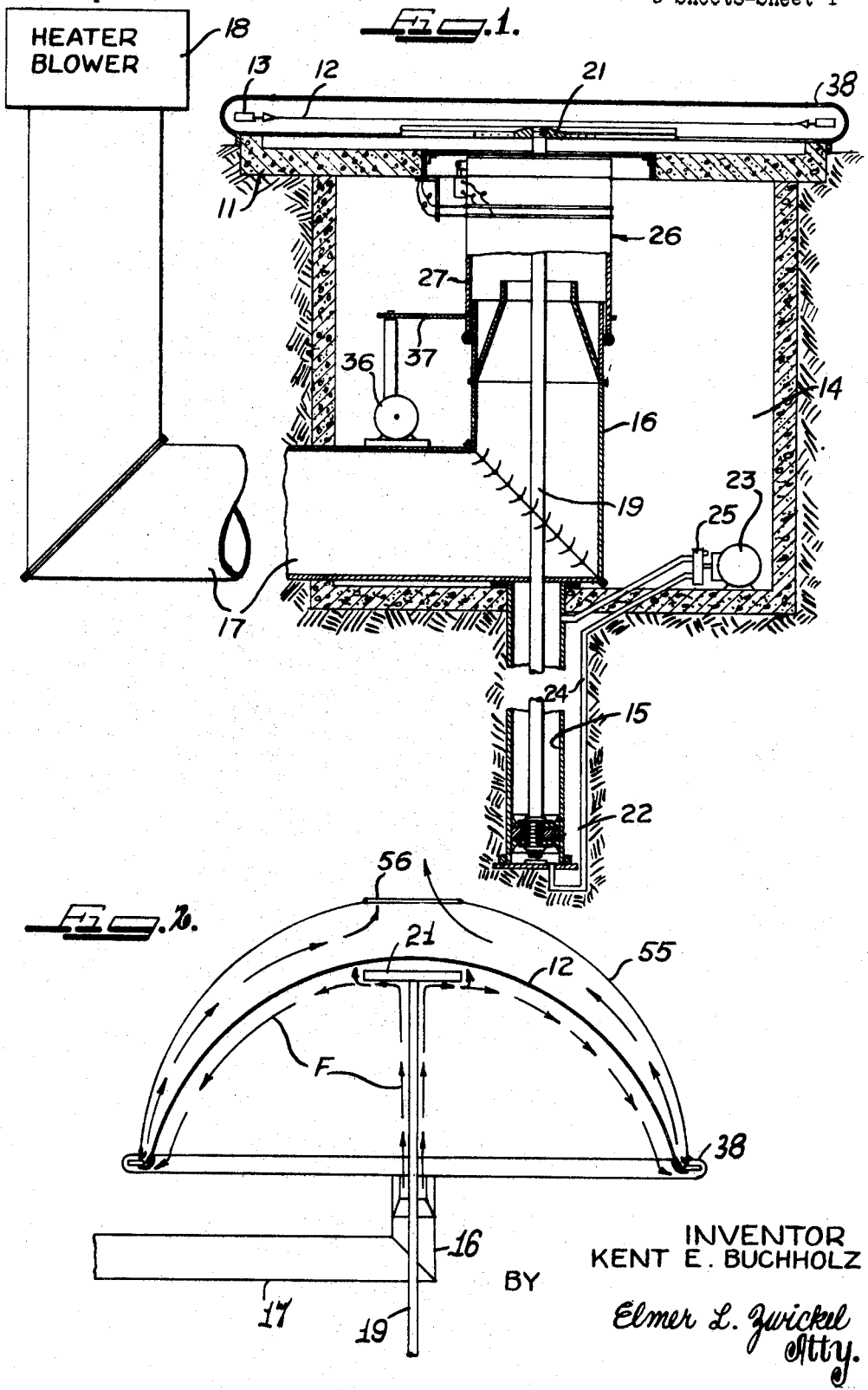

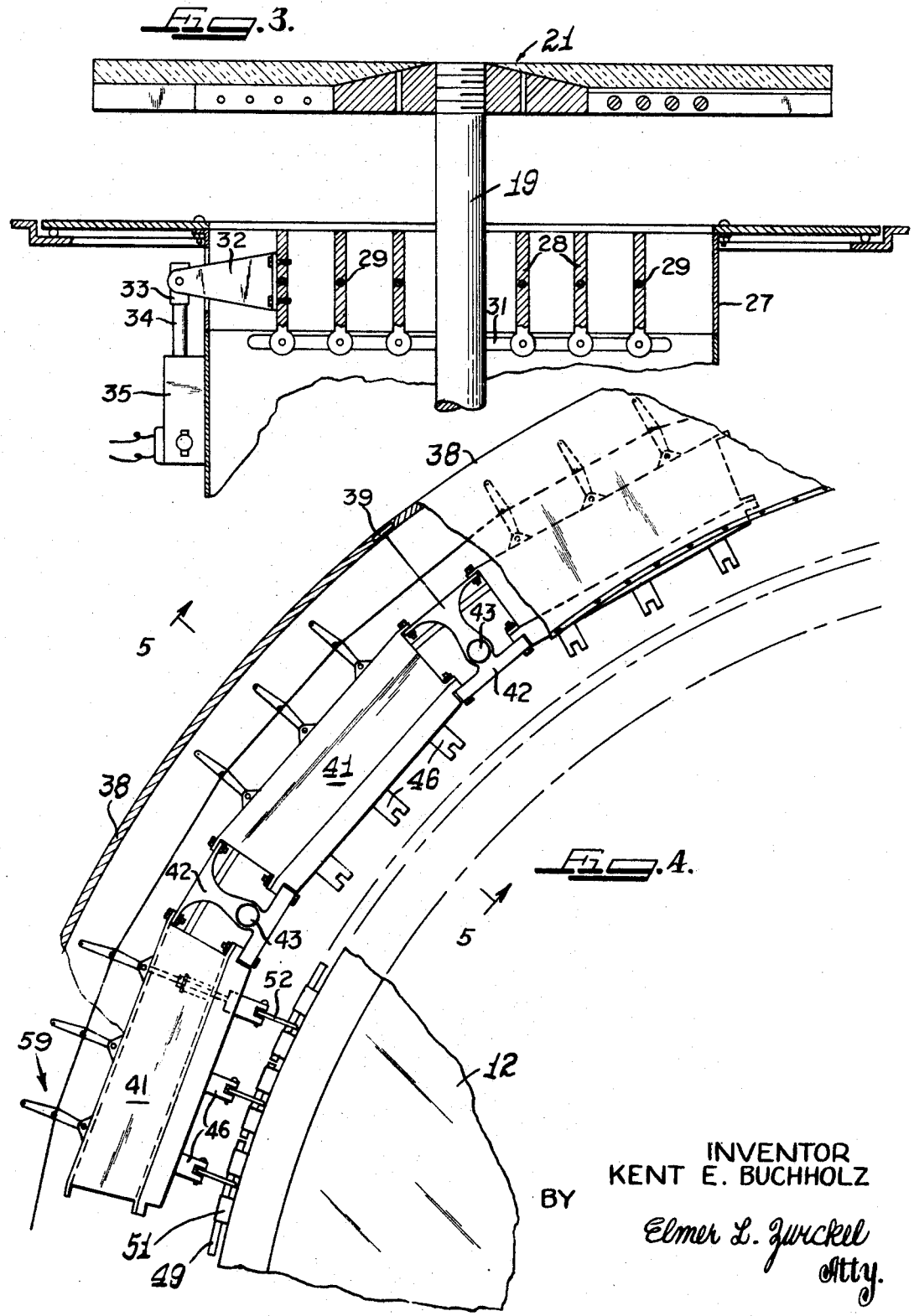

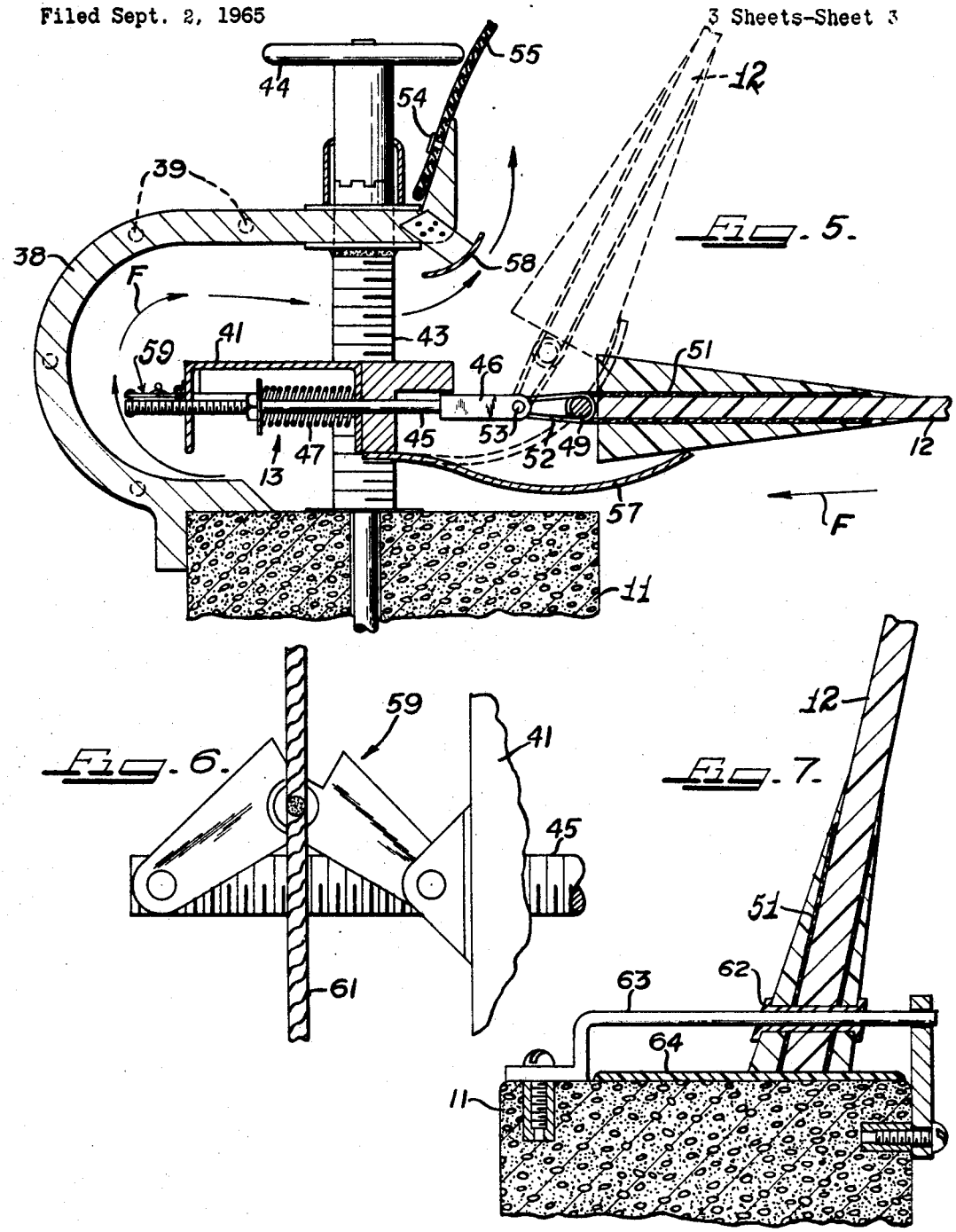

3,388,428
APPARATUS FOR FORMING PLASTIC
SHEET MATERIAL
Kent E. Buchholz, Villa Park, Ill.
(105 Cedar Circle, Streamwood, Ill. 60103)
Filed Sept. 2, 1965, Ser. No. 484,549
4 Claims. (Cl. 18—19)

ABSTRACT OF THE DISCLOSURE

Apparatus and method for forming a dome from a sheet of plastic material by means of the inflow of hot air beneath a sheet held by perimeter clamps and including means to direct the air stream under and over the sheet during the forming operation.

The invention relates to improvements in the means for forming self-sustaining plastic domes, particularly relatively large semi-spherical domes adapted for use as coverings for restaurants and places of entertainment, recreation shelters and as homes, etc.

Heretofore, domes of this general character have been fabricated by the placement of individual plastic panels on a frame structure. This results in a dome having unsightly and objectionable visible frame structures and one that is costly and time consuming to produce and erect.

The herein disclosed method of using the apparatus of the invention involves the initial laying of a large circular sheet of clear or colored plastic on a flat surface, securing it along its perimeter and then injecting therebeneath a stream or streams of air heated to a temperature that will soften the plastic sheet. Continued application of hot air under increased pressure urges the sheet into an upward direction so as to generate a semi-spherical dome shape. When the dome is formed the temperature of the pressurized air supply is gradually reduced and the sheet is allowed to cool gradually. This cooling may be natural or it may be attained by artificial cooling means or by forced air circulation. When cool the sheet becomes rigid.

An object is to provide novel means for forming a plastic dome from a single sheet of material.

Another object is to provide novel means for directing a stream of hot pressurized air beneath and against a sheet of flat plastic material so as to render the sheet semi-plastic.

Another object is to provide novel devices for anchoring the perimeter of a plastic sheet during the forming operation.

Another object of the invention is to provide novel air flow direction means.

Another object is to provide novel means to assure that both surfaces of the plastic sheet are subjected to the effect of the applied hot air flow.

Another object is to provide novel means to anchor the formed dome rigidly to its foundation.

Another object is to provide a means for forming a plastic sheet into a semi-spherical dome, which is not too expensive to construct and operate, and which is very efficient.

A preferred exemplary embodiment of the invention is disclosed in the accompanying drawings, in which:

FIG. 1 is a vertical sectional view through the apparatus utilized in forming the semi-spherical plastic dome.

FIG. 2 is a schematic view of the apparatus and dome.

FIG. 3 is an enlarged detail vertical sectional view through the air distribution devices.

FIG. 4 is a plan view of a fragment of the perimeter securement means, showing the channel partially broken away.

FIG. 5 is an enlarged vertical sectional view of the perimeter clamp.

FIG. 6 is an enlarged detail view of the clamp lock means.

FIG. 7 is an enlarged sectional view of the anchoring means for the finished dome.

Referring to the exemplary disclosure in the accompanying drawings, and particularly to FIGS. 1 and 2, a substantially flat floor surface 11, heat insulated, is provided by means of any conventional construction process which may include a foundation or piers (not shown) of sufficient strength to insure rigidity to the floor surface.

A heavy gauge sheet of plastic material 12, clear or tinted, is laid flat over the floor surface and its peripheral edge is clamped by means of clamps 13, to be described in detail hereinafter. The floor surface includes a well 14 having a deep cylindrical pit 15 depending therefrom axially. Disposed in the well 14 is a vertical duct 16 communicating with an inlet duct 17 having connection with a combination air heater and blower generally indicated at 18.

Mounted within the lined pit 15 is a ram 19 having a circular plate structure 21 firmly attached to its upper end which is disposed below the sheet 12. The lower end of said ram carries a piston structure 22 that cooperates with the lined cylindrical wall of the pit 15. An air compressor 23 is arranged preferably within the well 14 and is connected with opposite ends of the lined pit 15 by conduits 24 having a suitable reversing valve assembly 25 therein all operable to selectively admit pressurized air into the pit for raising and lowering the ram. Obviously, automatic or manually controlled means located above the ground level may be provided to operate the air compressor and valve assembly.

Referring now to FIG. 1, which best shows the structure for admitting hot air under pressure delivered by blower 18 into the region beneath sheet 12, the upper region of the well 14 is disposed to house air deflector means generally shown at 26. This mechanism includes a cylindrical housing 27 that is suspended over and is freely rotatable about vertical duct 16. The housing 27 includes (FIG. 3) a plurality of generally vertically disposed vanes 28 which are pivoted at their centers, as at 29, and have a common connector link 31. One end vane 28 carries an arm 32 that is pivotally connected to one end of a link 33, the other end of which is connected to piston rod 34 of a reciprocable motor 35 having its supply lines leading to a control located outside the structure. This assembly operates to tilt the vanes 28 so as to direct hot air flowing into and through the duct 16 upwardly angularly radially or straight depending upon the vane setting. The circumferential direction of flow may also be varied by rotating the vane assembly housing 27 as by means of a motor 36 (FIG. 1) connected thereto by a chain drive 37. The controls for this motor are also outside the structure. Thus it will be observed that hot air, pressurized, is delivered against the underside of the circular plate structure 21 at all times during operation.

The clamp structure 13 will now be described. Referring specifically to FIGS. 4, 5 and 6, this structure includes a plurality of channel segments 38 several of which are arranged end to end to form a circle that is of larger diameter than the diameter of the plastic sheet 12. These segments 38 are seated on and secured to the rim of the floor surface 11 and their channels are all facing inwardly radially. They preferably are connected end to end by connector pins 39.

Arranged within each radial channel segment 38 is an inverted channel 41. These channels 41 are each of a length substantially coextensive with the length of a channel segment 38 and they are connected end to end by a connecting bracket 42 tapped to receive an adjusting screw 43 journalled freely in a bearing carried by the radial channels 38. Each screw carries a hand wheel 44 so as to be manually rotatable to raise or lower the inverted channel 41 within the radial channel segments 38. As will be better understood hereinafter, this affords means to control the rate of flow of hot air from beneath the sheet 12 into the channel and over the top of the sheet.

Each inverted channel 41 carries a plurality of clamps 13. As best shown in FIG. 5, these clamps each comprise a pin 45 that slides freely in the depending side walls of inverted channel 41 and carries on its inwardly disposed end a clevis 46. A spring 47 surrounding the pin 45 normally urges the pin into a retracted position.

The perimeter of the plastic sheet 12 is formed with a thickened wedge shaped edge, as at 48, and for purposes of securing this edge to the clamp elements 13, said edge has laid outwardly thereof a series of bars 49 which are secured to said sheet edge by strips of tough fabric or metallic material 51 that are wrapped around the bars 49 and embedded in and integrally connected to the sheet margin. Arranged on the rods, between strips 51 are a plurality of eyelets 52. These eyelets are each fitted into one of the clevises 46 and secured thereto by a removable pin 53. When initially secured, the clamp elements 13 are in extended position: that is, the springs 47 thereon are compressed.

The radial channel segments 38 preferably carry on the inside margin of their upper wall a series of headed studs 54 to which is secured the peripheral margin of a hood 55, of canvas or the like, which lies loosely over the plastic sheet 12 and has an axial opening 56 (FIG. 2) therein.

As above described, the plastic sheet 12 is now arranged and secured in a manner to permit it to be formed into a semi-spherical dome.

This is accomplished by admitting under pressure of about 1½ pounds per square inch, air heated to a temperature of from about 290° F. to 350° F. into the ducts 16–17 from where it is directed upwardly against the circular plate structure 21 on ram 19 and then outwardly radially beneath the sheet 12 as shown by the arrows F. The air flowing beneath the sheet enters the channel segments 38 and it flows in a reverse direction over the top surface of sheet 12 and beneath the hood 55 and out through opening 56 therein. In order to prevent leakage in the area of clamp elements 13, a circular shield 57 (FIG. 5) is arranged beneath said elements and which has its inner periphery urged at all times against the bottom peripheral margin of the plastic sheet. Also, a deflector ring 58 is carried by the radial channel segments 38 to prevent leakage beneath the bottom peripheral edge of hood 55.

This heated air renders the sheet semi-plastic and pliable. During softening of the sheet it tends to expand outwardly radially and this expansion is compensated for by the clamp elements 13 which move outwardly radially under the influence of their springs 47. This maintains the sheet 12 taut and avoids wrinkling. When the sheet has been softened sufficiently to permit its being formed, a series of lock elements 59 (FIG. 6) one associated with each clamp pin 45, are actuated to lock the clamp elements in retracted sheet holding position. These lock elements each comprise a toggle linkage one link of which is connected to the channel segment 41 and the other to the clamp pin 45. They are all connected, or at least groups of them are connected, to a common cable 61 which may be pulled in one direction to lock the clamp elements 13 or in an opposite direction to unlock said elements after the forming is complete.

With the sheet now in a semi-plastic state and held firmly at its perimeter by the clamp elements 13, air pressure is increased so as to cause the sheet to gradually assume a semi-spherical condition as illustrated in FIG. 2. During this forming operation the ram 19 is slowly elevated so as to maintain the air distribution plate 21 in close proximity at all times with the sheet while it is being elevated.

Ram elevation is accomplished in the present disclosure by slowly applying a pressure against the lower end thereof. As stated, while the dome is being formed, the flow of hot air is continued so as to exert a total lifting force of about 55,000 pounds (for a sheet 20 feet in diameter) on the under side of the sheet and when the sheet has assumed the required semi-spherical shape, the temperature of the hot air is gradually lowered so that the semi-plastic spherical dome can gradually cool. It thereby regains its rigidity and the ram may now be returned to its lowered position. In the within disclosure a sheet having a thickness, for example, of about one-half an inch is reduced in thickness to about one-fourth of an inch.

All that remains to be done is to remove the operational equipment, sever the rod retaining strips 51 at the peripheral edge of the dome, if desired, and then anchor the formed dome to its support surface. To this end the thickened perimeter is formed with a plurality of circumferentially spaced apertures 62 or eyelets (FIG. 7) each to receive an anchor yoke 63 that is then secured to the support surface 11. Preferably a weather seal 64 is arranged on the support surface 11. A doorway or other desired openings may be cut into the dome wherever required.

Although I have described a preferred embodiment of my invention it will be understood that the description thereof is intended to be illustrative, as many details of the structure and steps of the method may be modified or changed without departing from the spirit or scope of the invention.

Accordingly, I do not desire to be restricted to the exact construction and steps of the method described.

I claim:

1. Apparatus for forming a dome from a circular plastic sheet, a flat surface over which the plastic sheet is arranged, a plurality of circumferentially spaced clamps engaged with the peripheral margin of said sheet, means to deliver pressurized hot air to the under surface of said sheet so as to render the sheet pliable and to raise the sheet into a semi-spherical dome, means tensioning said clamps so as to retain the plastic sheet taut, a normally retracted ram arranged beneath the axial center of said sheet, means carried by the ram to insure uniform distribution of the hot air beneath the sheet, means operable to urge the ram upwardly while the sheet is being formed into its semi-spherical shape, manually controlled means to direct the flow of air entering beneath said sheet, and means to permit hot air flowing beneath said sheet to escape around the perimeter thereof and be directed over the outside top surface of said sheet.

2. The apparatus recited in claim 1, in which the means for directing hot air over the outside of the sheet comprises a canopy.

3. The apparatus recited in claim 1, in which means is provided to control the rate of flow of hot air from beneath said sheet.

4. Apparatus for forming a dome from a circular plastic sheet, a flat surface over which the plastic sheet is arranged, a plurality of circumferentially spaced clamps engaged with the peripheral margin of said sheet, means to deliver pressurized hot air to the under surface of said sheet so as to render the sheet pliable and to raise the sheet into a semi-spherical dome, means tensioning said clamps so as to retain the plastic sheet taut, manually controlled means to direct the flow of hot air entering beneath said sheet, and means to permit hot air flowing beneath said sheet to escape around the perimeter thereof and be directed over the outside top surface of said sheet.

References Cited

UNITED STATES PATENTS

| | | | |
|---|---|---|---|
| 2,335,300 | 11/1943 | Neff | 264—34 |
| 2,365,637 | 12/1944 | Helwig | 264—93 |
| 2,367,642 | 1/1945 | Helwig | 264—100 X |
| 2,856,634 | 10/1958 | Ames | 264—93 |
| 2,891,280 | 6/1959 | Politis | 264—94 |
| 3,118,182 | 1/1964 | De Muth | 264—89 X |
| 3,287,765 | 11/1966 | Puenti | 18—19 |
| 2,123,552 | 7/1938 | Helwig | 18—19 |
| 3,258,813 | 7/1966 | Groth et al. | 18—19 |

ROBERT F. WHITE, *Primary Examiner.*

ALEXANDER H. BRODMERKEL, *Examiner.*

A. R. NOË, *Assistant Examiner.*